UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC-LIKE SUBSTANCE.

1,084,334.     Specification of Letters Patent.     Patented Jan. 13, 1914.

No Drawing.     Application filed March 20, 1911. Serial No. 615,671.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Vulcanized Caoutchouc-Like Substances, of which the following is a specification.

By our application Ser. No. 578,608 the production of a new caoutchouc like substance is described, which is obtained by polymerizing erythrene. It has now been found that this caoutchouc like substance can be vulcanized, substances being obtained equal to and some even better than vulcanized natural caoutchouc. These facts could not be foreseen in the existent state of knowledge with regard to the nature and the processes during the vulcanizing of caoutchouc. One could not know if this new caoutchouc-like substance too would show the same behavior to vulcanizing agents as the natural caoutchouc does. Still equal to and some even better than vulcanized product, if it could be obtained at all, would have the same valuable properties of vulcanized caoutchouc.

Example 1: 5 parts of the caoutchouc like substance obtained by the polymerization of erythrene are dissolved in 100 parts of benzene. A solution of one part of sulfur mono-chlorid ($S_2Cl_2$) in 50 parts of carbon disulfid $CS_2$ is added and the mixture is allowed to stand for 1.5 to 2 minutes, and is then poured into alcohol. On stirring a substance separates which is distinguished from the parent material by being of greater toughness and of better resistance to different agents. It is grayish in color and not adhesive.

Example 2: 50 parts of the caoutchouc like substance obtained by polymerization of erythrene are intimately mixed by means of mixing rolls with 15 parts of powdered sulfur. The product shaped from the resulting sheet is then heated in a suitable apparatus for from 5 to 6 hours at 150–160° C.

Example 3: 100 parts of the product of polymerization obtained from erythrene are carefully worked together with 10 parts of sublimed sulfur in a mixing apparatus provided with rolls until a perfectly homogeneous mass results. The resulting product is brought into the desired shape and is then subjected in an iron vulcanizing vessel to the action of steam under a pressure of 3–4 atmospheres. After from 3–4 hours the process is complete.

Instead of the product of polymerization used in the examples a mixture of the caoutchouc like product obtained from erythrene with natural caoutchouc can be used; similarly other methods of vulcanization can be employed.

The novel caoutchouc substance of the present invention forms an ozonid, which upon decomposition with water yields succinic aldehyde. Vulcanized mixtures of erythrene caoutchouc and natural caoutchouc form ozonids which upon decomposition with water give succinic aldehyde and levulinic aldehyde.

We claim:—

1. As a new product a vulcanized caoutchouc-like substance comprising vulcanized erythrene caoutchouc, being a grayish non-adhesive substance containing sulfur and forming an ozonid which upon decomposition with water yields succinic aldehyde.

2. As a new product a vulcanized caoutchouc-like substance comprising a vulcanized mixture of erythrene caoutchouc and natural caoutchouc, being a grayish non-adhesive substance containing sulfur and forming ozonids which upon decomposition with water yield succinic aldehyde and levulinic aldehyde.

In testimony whereof we have hereunto set our hands in the presence of two subscribing witnesses.

FRITZ HOFMANN. [L. S.]
    CARL COUTELLE. [L. S.]

Witnesses:
    CHAS. J. WRIGHT,
    ALFRED HENKEL.

It is hereby certified that in Letters Patent No. 1,084,334, granted January 13, 1914, upon the application of Fritz Hofmann and Carl Coutelle, of Elberfeld, Germany, for an improvement in "Vulcanized Caoutchouc-Like Substances," an error appears in the printed specification requiring correction as follows: Line 24, strike out the words "equal to and some even better than" and insert the words *less could one predict whether the;* and that the said Letters Patent should be read with this correction therein that the same may conform to the record of the case in the Patent Office.

Signed and sealed this 21st day of April, A. D., 1914.

[SEAL.]

J. T. NEWTON,

*Acting Commissioner of Patents.*